(12) United States Patent
Chang

(10) Patent No.: US 8,804,244 B2
(45) Date of Patent: Aug. 12, 2014

(54) METHOD FOR MANUFACTURING DIFFRACTION GRATING

(75) Inventor: Jen-Tsorng Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 18 days.

(21) Appl. No.: 13/537,067

(22) Filed: Jun. 29, 2012

(65) Prior Publication Data

US 2012/0266448 A1 Oct. 25, 2012

Related U.S. Application Data

(62) Division of application No. 12/192,031, filed on Aug. 14, 2008, now Pat. No. 8,254,028.

(30) Foreign Application Priority Data

Nov. 5, 2007 (CN) .......................... 2007 1 0202379

(51) Int. Cl.
*G02B 5/18* (2006.01)

(52) U.S. Cl.
USPC ............................ 359/569; 359/566; 359/576

(58) Field of Classification Search
CPC .. G02B 5/1814; G02B 5/1866; G02B 5/1861; G02B 5/1847

USPC .......................................... 359/566, 576, 900
See application file for complete search history.

(56) References Cited

U.S. PATENT DOCUMENTS

| | | | | |
|---|---|---|---|---|
| 5,258,871 A | * | 11/1993 | Gupta | 359/489.06 |
| 6,884,961 B1 | * | 4/2005 | Dmitriev et al. | 219/121.69 |
| 2005/0127831 A1 | * | 6/2005 | Takeuchi et al. | 313/506 |
| 2008/0166190 A1 | * | 7/2008 | Gardiner et al. | 407/11 |

* cited by examiner

*Primary Examiner* — James Greece
*Assistant Examiner* — Sharrief Broome
(74) *Attorney, Agent, or Firm* — Novak Druce Connolly Bove + Quigg LLP

(57) ABSTRACT

A method for manufacturing a diffraction grating comprises below steps. Firstly providing a substrate which having a first surface and a second surface opposite to the first surface. Then providing a first predetermined function associated with arrangement of the grooves of the first grating and a second predetermined function associated with arrangement of the grooves of the second grating. Thirdly transforming the first function into a first Fourier series and transforming the second function into a second Fourier series. Fourthly forming the first grating on the first surface of the substrate using a fast tool sever system according to the first Fourier series. Lastly forming the second grating on the second surface using the fast tool sever system according to the second Fourier series.

3 Claims, 1 Drawing Sheet

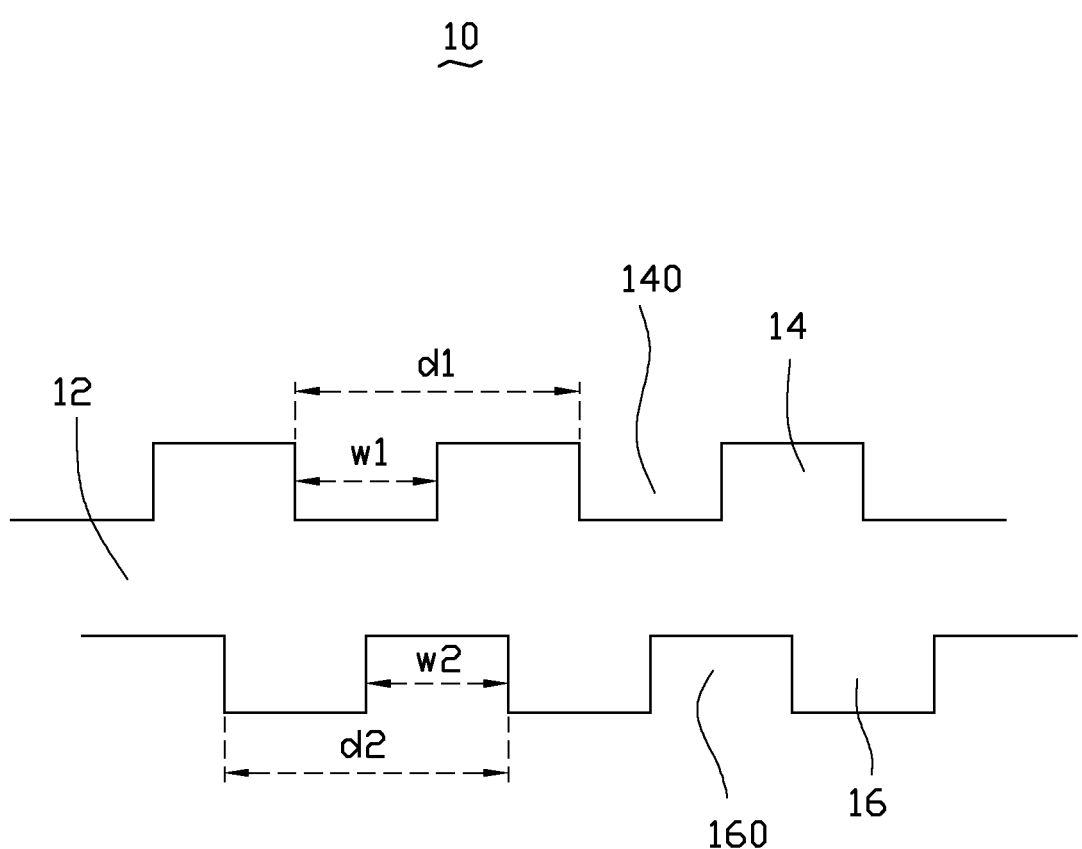

US 8,804,244 B2

METHOD FOR MANUFACTURING DIFFRACTION GRATING

CROSS-REFERENCE TO RELATED APPLICATION

This application is a divisional application of and claims the benefit of U.S. patent application Ser. No. 12/192,031 filed Aug. 14, 2008, entitled "DIFFRACTION GRATING STRUCTURE AND METHOD FOR MANUFACTURING SAME", the entire contents of which are incorporated herein by reference.

BACKGROUND

1. Technical Field

The present disclosure generally relates to optical diffraction elements, particularly, to a diffraction grating structure and a method for manufacturing the same.

2. Discussion of Related Art

Diffraction gratings are widely used in technology. In particular, the diffraction gratings serve as dispersive elements for spectrum analyzers and are also often used in laser devices serving to select, tune, and expand the light spectrums of the laser devices. In integrated optics and light communication, a diffraction grating is an advantageous optical-coupling element.

Currently, diffraction gratings are manufactured by one of two methods. The first method is using ruling engines. Diffraction gratings manufactured with a ruling engine are called mechanically ruled gratings. Grooves of the mechanical ruled grating have different characteristics because of ability of the ruling engines. Some various stray lines produced in a photographic side of the grating can effect application of the grating in high impact spectrometers. Using ruling to manufacture the ruled grating is costly, requiring a lot of time and strict control of the production environment, so that application of the mechanical ruled grating is limited.

The second method involves laser technology. Diffraction gratings made this way are called holographic gratings and have sinusoidal grooves. For holographic gratings, lasers are used on a substrate to etch film coated thereon, to form a regular pattern of grooves, and the grooves may then be bombarded with an ion beam to produce a blazed grating and to enhance grating diffraction efficiency.

The diffraction gratings manufactured by the above two methods are usually a single surface structure. Light beams passing through the gratings cannot be converted from a low spatial frequency to a high spatial frequency.

What is needed, therefore, is a diffraction grating structure configured for modulating low spatial frequency light into high spatial frequency light and a method for manufacturing the same.

BRIEF DESCRIPTION OF THE DRAWING

Many aspects of the present diffraction grating structure and method for manufacturing same can be better understood with reference to the following drawing. The components in the drawing are not necessarily drawn to scale, the emphasis instead being placed upon clearly illustrating the principles of the present diffraction grating and method for manufacturing the same. Moreover, in the drawing, like reference numerals designate corresponding parts throughout the several views.

The drawing is a schematic view of a diffraction grating structure in accordance with a present embodiment.

DETAILED DESCRIPTION

Embodiments of the present disclosure will now be described with reference to the attached drawing.

Referring to FIG. 1, a diffraction grating structure 10 includes a substrate 12, a first grating 14, and a second grating 16.

A period (or cycle) of the first grating 14 is labeled $d_1$, and the first grating 14 includes a plurality of first grooves 140 and has a width $w_1$. A period of the second grating 16 is labeled $d_2$, and the second grating 16 includes a plurality of second grooves 160 and has a width $w_2$.

When the value of $d_1$ is not equal to that of $d_2$, the difference between $w_1$ and $w_2$ is less than 5 micrometers.

When the value of $d_1$ is equal to that of $d_2$, the value of $w_1$ is equal to, or less than, or greater than that of $w_2$.

When value of $d_1$ is equal to that of $d_2$, the beginning of each of the first grooves 140 is misaligned with that of each of the second grooves 160.

Alternatively, when the value of $d_1$ is equal to that of $d_2$, the first groove 140 aligns with the second groove 160. That is, the beginning of each of the first grooves 140 is aligned with that of the second groove 160.

The profile of the first groove 14 of the first grating 14 can be described by the following function $f_1(x_1)$ which has a period $d_1$.

$$y = f_1(x_1) = \tan\theta \cdot x_1$$
$$\left(-\frac{d_1}{2} \le x \le \frac{d_1}{2}\right)$$

$f_1(x_1)$ is an odd function, so $f_1(x_1)$ can be expanded into Fourier sinusoidal series as follows:

$$f_1(x_1) = \sum_{n=1}^{\infty} b_n \cdot \sin\frac{2n\pi x_1}{d_1}$$

$$\left(b_n = \frac{4}{d_1}\int_0^{\frac{d_1}{2}} \tan\theta \cdot x_1 \cdot \sin\frac{2n\pi x_1}{d_1} d_1 x_1 = (-1)^{n-1}\frac{d_1 \cdot \tan\theta}{n\pi} x_1\right)$$

Thus $f_1(x_1)$ is described as an expression (1).

$$f_1(x_1) = \frac{d_1 \tan\theta}{\pi}\left[\sin\frac{2\pi x_1}{d_1} - \frac{1}{2}\sin\frac{4\pi x_1}{d_1} + \frac{1}{3}\sin\frac{6\pi x_1}{d_1} - \frac{1}{4}\sin\frac{4\pi x_1}{d_1} + \ldots\right] \quad (1)$$

As more values for n are used, the synthetic curve more precisely represents $f_1(x_1)$. In manufacturing, how many values of n are used depends on amount of precision required. To find optimal solution, amplitude or phase of $f_1(x_1)$ can be modified. In the present embodiment, the series is formed using n as a whole integer greater than 0, and the first three values 1,2, and 3 are used, so $f_1(x_1)$ is described as function (2).

$$f_1(x_1) = \frac{d_1 \tan\theta}{\pi}\left[\sin\frac{2\pi x_1}{d_1} - \frac{1}{2}\sin\frac{4\pi x_1}{d_1} + \frac{1}{3}\sin\frac{6\pi x_1}{d_1}\right] \quad (2)$$

As same, the profile of the second grating 16 is described by $f_2(x_2)$ which is read as function (3). In the present embodiment, $f_2(x_2)$ is taken the first three series, so $f_2(x_2)$ is also described as function (4).

$$f_2(x_2) = \frac{d_2\tan\theta}{\pi}\left[\sin\frac{2\pi x_2}{d_2} - \frac{1}{2}\sin\frac{4\pi x_2}{d_2} + \frac{1}{3}\sin\frac{6\pi x_2}{d_2} - \frac{1}{4}\sin\frac{4\pi x_2}{d_2} + \ldots\right] \quad (3)$$

$$f_2(x_2) = \frac{d_2\tan\theta}{\pi}\left[\sin\frac{2\pi x_2}{d_2} - \frac{1}{2}\sin\frac{4\pi x_2}{d_2} + \frac{1}{3}\sin\frac{6\pi x_2}{d_2}\right] \quad (4)$$

From knowledge of the light interference, that is known value of $d_1$ is described as $$\frac{\lambda_1}{2n_1\sin\alpha_1},$$

wherein, $\lambda_1$ is wavelength, $\alpha_1$ is a half of angle of two coherent beams, and $n_1$ is a diffraction index. Thus, spatial frequency labeled $f_1$ of the first grating 14 is equal to $$\frac{1}{d_1}.$$

In condition of air, $n_1$ is equal to 1, then, $d_1$ is equal to $$\frac{\lambda_1}{2\sin\alpha_1}.$$

Same as the first grating 14, in the condition of air, value of $d_2$ of the second grating 16 is described as $$\frac{\lambda_2}{2n_2\sin\alpha_2},$$

wherein, $\lambda_2$ is wavelength, $\alpha_2$ is a half of angle of two coherent beams, and $n_2$ is a diffraction index. Thus, spatial frequency labeled $f_2$ of the second grating 16 is equal to $$\frac{1}{d_2}.$$

In operation, when a light beam having frequency of f passes through the first grating 14 and shines on the second grating 16, the light beam is firstly modulated by the first grating 14 and has a frequency of f+$f_1$, and then, the modulated light beam is modulated by the second grating 16 and has a frequency of f+$f_1$+$f_2$. Thereof, the light beam is modulated and has a high spatial frequency f+$f_1$+$f_2$.

During manufacturing of the diffraction grating 10, a fast tool servo system (shorten in FTS system) is used to machine the first grating 14 and the second grating 16.

$f_1(x_1)$ is input into the FTS system, then the FTS system is instructed by $f_1(x_1)$ and to machine the first grating 14 on the first surface of the substrate 10. After finishing the first grating 14, $f_2(x_2)$ is input into the FTS system, then the FTS system is instructed by $f_2(x_2)$ and to machine the second grating 16 on the second surface of the substrate 10. By using the FTS system to form the first grating 14 and the second grating 16, an optical photoresist film can be omitted, thus, this method achieves a lower cost.

If the first groove 140 is offset from the second groove 160, during manufacturing of the second grating 16, the tool of the FTS system is firstly controlled to machine the difference $d_1$–$d_2$, and then controlled to machine the second grating 16 according to $f_2(x_2)$.

Alternatively, a Ni alloy film can be coated on two surfaces of the substrate 10, and then the first grating 14 and the second grating 16 are formed on the substrate 10.

In conclusion, the diffraction grating structure of the substrate 10 of the present embodiment utilizes two grating structures to modulate a low spatial frequency light into a high spatial frequency light. Therefore, it is favorable to apply such diffraction grating to high spatial frequency needed environment to increase efficiency. Such as in motor encoder/decoder, the diffraction grating structure 10 can be used to match with laser and sensor to obtain rotate speed and position of motor.

It is to be understood that the above-described embodiment is intended to illustrate rather than limit the disclosure. Variations may be made to the embodiment without departing from the spirit of the disclosure as claimed. The above-described embodiments are intended to illustrate the scope of the invention and not restrict the scope of the disclosure.

What is claimed is:

1. A method for manufacturing a diffraction grating, the method comprising:

providing a substrate having a first surface and a second surface opposite to the first surface;

providing a first predetermined function associated with arrangement of grooves of the first grating and a second predetermined function associated with arrangement of grooves of the second grating, wherein the first predetermined function is $$f_1(x_1) = \frac{d_1\tan\theta}{\pi}\left[\sin\frac{2\pi x_1}{d_1} - \frac{1}{2}\sin\frac{4\pi x_1}{d_1} + \frac{1}{3}\sin\frac{6\pi x_1}{d_1}\right]$$

and the second predetermined function is $$f_2(x_2) = \frac{d_2\tan\theta}{\pi}\left[\sin\frac{2\pi x_2}{d_2} - \frac{1}{2}\sin\frac{4\pi x_2}{d_2} + \frac{1}{3}\sin\frac{6\pi x_2}{d_2}\right],$$

where $\theta$ is a half of an angle of two coherent beams used to manufacture the first and second grating, d1 is a period of the first grating, d2 is a period of the second grating, x1 is a longitudinal coordinate which has an origin at the center of the first grating, and x2 is another longitudinal coordinate which has another origin at the center of the second grating;

transforming the first function into a first Fourier series and the second function into a second Fourier series;

forming the first grating on the first surface of the substrate using a fast tool servo system according to the first Fourier series;

forming the second grating on the second surface using the fast tool servo system according to the second Fourier series.

2. The method as claimed in claim 1, wherein a Ni alloy film is formed on the first surface and the second surface of the substrate.

3. The method as claimed in claim 1, wherein the fast tool servo system is driven by a piezoelectric ceramic driver to form the first grating and the second grating.

* * * * *